(12) United States Patent
Grutzeck et al.

(10) Patent No.: US 7,905,544 B2
(45) Date of Patent: Mar. 15, 2011

(54) CARRIER ELEMENT

(75) Inventors: Helmut Grutzeck, Maehringen (DE); Johann Wehrmann, Balingen (DE); Conrad Haeussermann, Sonnenbuehl (DE); Klaus Kasten, Reutlingen (DE)

(73) Assignee: Robert Bosh GmbH, Stuttgart (DE)

( * ) Notice: Subject to any disclaimer, the term of this patent is extended or adjusted under 35 U.S.C. 154(b) by 111 days.

(21) Appl. No.: 11/658,236

(22) PCT Filed: May 30, 2005

(86) PCT No.: PCT/EP2005/052454
§ 371 (c)(1),
(2), (4) Date: Nov. 6, 2008

(87) PCT Pub. No.: WO2006/008206
PCT Pub. Date: Jan. 26, 2006

(65) Prior Publication Data
US 2009/0066128 A1    Mar. 12, 2009

(30) Foreign Application Priority Data
Jul. 22, 2004   (DE) .................. 10 2004 035 454

(51) Int. Cl.
*B60N 2/42* (2006.01)
*B60R 21/00* (2006.01)

(52) U.S. Cl. ........... 297/216.13; 297/216.1; 297/216.12; 297/452.18; 297/452.2

(58) Field of Classification Search ............. 297/216.13, 297/452.18, 452.2, 216.1, 216.12
See application file for complete search history.

(56) References Cited

U.S. PATENT DOCUMENTS

| | | | | |
|---|---|---|---|---|
| 4,544,204 A * | 10/1985 | Schmale | ............... | 297/452.18 |
| 5,013,089 A * | 5/1991 | Abu-Isa et al. | ........ | 297/452.2 X |
| 5,333,775 A * | 8/1994 | Bruggemann et al. | ........ | 228/157 |
| 5,412,860 A * | 5/1995 | Miyauchi et al. | ...... | 297/452.2 X |
| 5,499,863 A * | 3/1996 | Nakane et al. | ............. | 297/452.2 |
| 5,509,716 A * | 4/1996 | Kolena et al. | ............. | 297/216.13 |
| 5,567,017 A * | 10/1996 | Bourgeois et al. | ......... | 297/452.2 |
| 5,636,901 A * | 6/1997 | Grilliot et al. | ............. | 297/452.18 |
| 5,749,135 A * | 5/1998 | Crane et al. | ............. | 297/452.2 X |
| 5,791,738 A * | 8/1998 | Niezoldt | ................... | 297/452.18 |
| 5,988,756 A * | 11/1999 | Aufrere et al. | ........... | 297/452.18 |
| 6,019,273 A * | 2/2000 | Garnweidner | ....... | 297/452.18 X |
| 6,088,640 A * | 7/2000 | Breed | .................. | 297/216.12 X |
| 6,213,548 B1 * | 4/2001 | Van Wynsberghe et al. | ....................... | 297/216.12 |
| 6,322,148 B1 * | 11/2001 | Kolena et al. | ............. | 297/452.2 |
| 6,352,311 B1 * | 3/2002 | Hayotte | ..................... | 297/452.2 |
| 6,423,388 B1 * | 7/2002 | Bateson et al. | ........ | 297/452.2 X |
| 6,513,878 B2 * | 2/2003 | Nagayasu et al. | ........ | 297/452.18 |
| 6,709,061 B2 * | 3/2004 | McWhinnie et al. | ..... | 297/452.18 |
| 6,746,078 B2 * | 6/2004 | Breed | ...................... | 297/216.12 |
| 6,761,412 B1 * | 7/2004 | Garnweidner et al. | .. | 297/452.18 |
| 6,779,841 B2 * | 8/2004 | Eckendorff | ............... | 297/216.13 |
| 6,805,404 B1 * | 10/2004 | Breed | ...................... | 297/216.12 |
| 6,824,211 B2 * | 11/2004 | Bayer et al. | ............. | 297/216.12 |
| 7,017,989 B2 * | 3/2006 | Yamaguchi et al. | ..... | 297/216.12 |

(Continued)

FOREIGN PATENT DOCUMENTS
DD    231 637    1/1986
(Continued)

*Primary Examiner* — Rodney B White
(74) *Attorney, Agent, or Firm* — Kenyon & Kenyon LLP

(57) ABSTRACT

A carrier element for an object. The carrier element has an essentially u-shaped form and includes two side pieces, which are interconnected by a bridge.

20 Claims, 2 Drawing Sheets

U.S. PATENT DOCUMENTS

| | | | |
|---|---|---|---|
| 7,066,552 B2 * | 6/2006 | Yoshida | 297/452.18 |
| 7,070,205 B2 * | 7/2006 | Becker et al. | 297/216.12 X |
| 7,073,856 B2 * | 7/2006 | Akaike et al. | 297/216.12 |
| 7,134,717 B2 * | 11/2006 | Thunnissen et al. | 297/216.12 |
| 7,195,092 B2 * | 3/2007 | Wu et al. | 297/216.1 X |
| 7,216,931 B2 * | 5/2007 | Friedman | 297/216.1 |
| 7,237,846 B1 * | 7/2007 | Arima | 297/452.18 X |
| 7,264,271 B2 * | 9/2007 | Barvosa-Carter et al. | 297/216.1 X |
| 7,527,334 B2 * | 5/2009 | Kiehler et al. | 297/216.13 |
| 2002/0047295 A1 * | 4/2002 | Sullivan et al. | 297/216.1 |
| 2003/0015898 A1 * | 1/2003 | Breed | 297/216.12 |
| 2003/0020306 A1 * | 1/2003 | Eckendorff | 297/216.1 |
| 2003/0192381 A1 | 10/2003 | Kelly et al. | |
| 2003/0201663 A1 * | 10/2003 | McWhinnie et al. | 297/452.2 |
| 2003/0227199 A1 * | 12/2003 | Yoshizawa et al. | 297/216.12 |
| 2004/0012234 A1 * | 1/2004 | Yamaguchi et al. | 297/216.12 |
| 2004/0195873 A1 * | 10/2004 | Saberan et al. | 297/216.13 |
| 2004/0239160 A1 * | 12/2004 | Thunnissen et al. | 297/216.12 |
| 2006/0186713 A1 * | 8/2006 | Breed | 297/216.12 |
| 2007/0096535 A1 * | 5/2007 | Lundell et al. | 297/216.1 X |
| 2007/0205643 A1 * | 9/2007 | Fujita et al. | 297/216.12 |
| 2009/0243354 A1 * | 10/2009 | Farquhar et al. | 297/216.12 |

FOREIGN PATENT DOCUMENTS

| | | |
|---|---|---|
| DE | 298 15 355 | 2/1999 |
| DE | 198 16 456 | 6/1999 |
| DE | 101 48 034 | 2/2003 |
| FR | 2 230 249 | 12/1974 |

* cited by examiner

CARRIER ELEMENT

SUMMARY OF THE INVENTION

A carrier element according to the present invention allows an especially shock-proof support of an object that is sensitive to shock loads, for instance a sensor sensitive to shock. The present invention is based on the recognition that, because of the special form design of the carrier element, there is barely any meaningful deformation of the carrier element in the connection region between the carrier element and the object in response to the action of force resulting from a shock load. The carrier element has an essentially u-shaped design and two side pieces that are interconnected by a bridge. In a particularly advantageous manner, these two side pieces extend essentially in parallel to each other in a first region and in a third region ending in the bridge, while they extend in a curved shape in a second region. In an especially advantageous manner, the clearance between the side pieces in the first region is greater than in the third region. While the side pieces and the bridge of the carrier element have essentially the same thickness in all regions, the height of the side pieces in the second region is preferably less than in the remaining regions, so that the spring force of the side pieces is able to be influenced in an advantageous manner.

DETAILED DESCRIPTION

Figure 1:
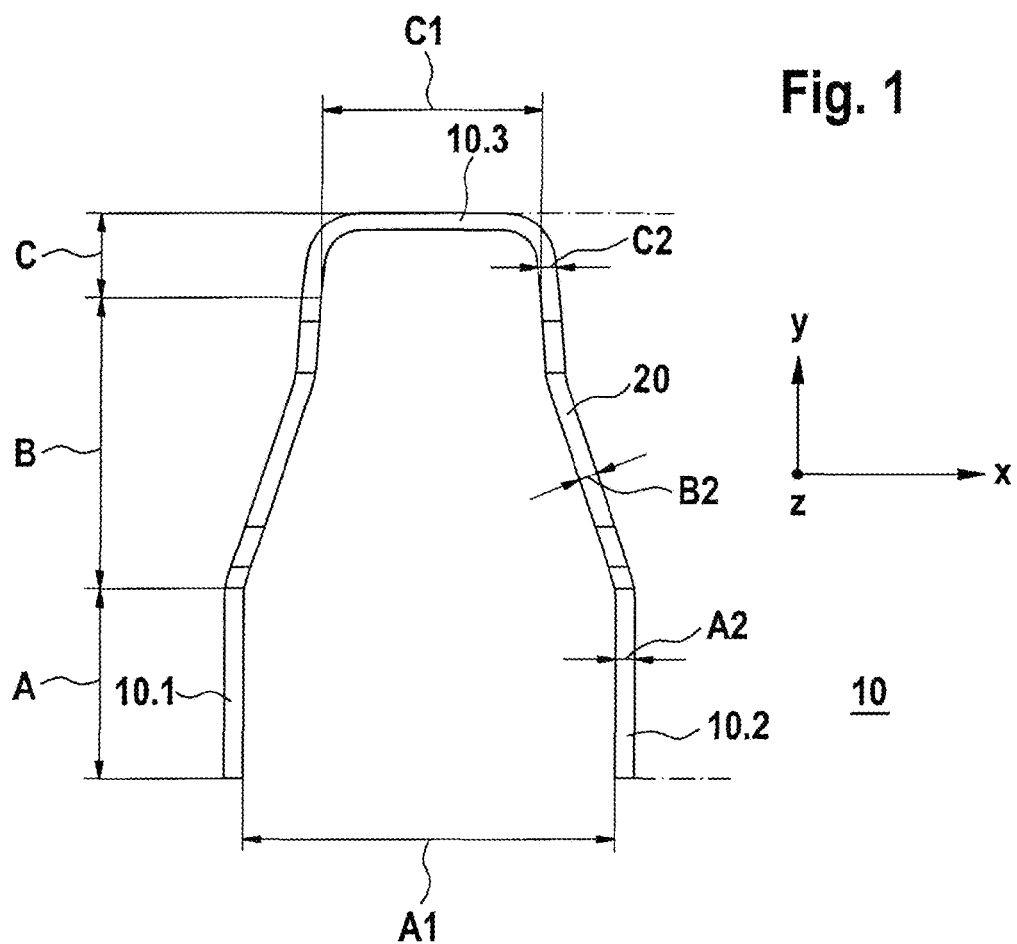
FIG. 1 shows a plan view of a carrier element.

FIG. 1 shows a plan view of a carrier element 10 configured according to the present invention. Carrier element 10 essentially has a u-shape and includes two side pieces 10.1, 10.2 which are interconnected by a bridge 10.3. Carrier element 10 may roughly be subdivided into three regions, A, B and C. In region A of carrier element 10, the free ends of side pieces 10.1, 10.2 of carrier element 10 extend essentially in parallel to one another. Side pieces 10.1, 10.2 have a clearance A1 in this region A, which exceeds their clearance C1 in region C of bridge 10.3 connecting them. In region B, which is situated between regions A and C, side pieces 10.1, 10.2 essentially extend in a curved shape with a slight inward curvature. The individual width of side pieces 10.1, 10.2 is denoted by A2, B2 and C2 in different regions A, B, C of carrier element 10. In a preferred exemplary embodiment of the present invention, the mentioned widths of side pieces 10.11, 10.2 are essentially identical. To facilitate the description, a rectangular coordinate system has been drawn in in the figures. In FIG. 1, the x- and the y-axes lie in the drawing plane, while the z-axis is perpendicular to the drawing plane. The same applies to the illustration in FIG. 2, which also represents a plan view of a carrier element 10. In FIG. 3, which shows a side view of a carrier element 10, the y- and the z-axes lie in the drawing plane, while the x-axis extends perpendicular to the drawing plane.

Figure 2:
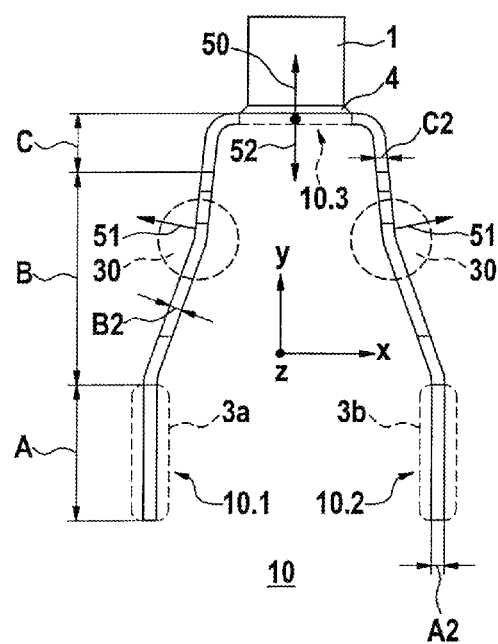
FIG. 2 shows a plan view of a carrier element, which is affixed on a holding device and carries an object.
Figure 3:
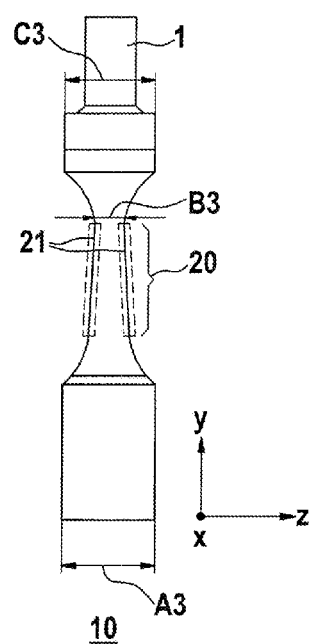
FIG. 3 shows a side view of the carrier element illustrated in FIG. 2.

FIG. 2 shows a plan view of a carrier element 10, which is affixed on a holding device and carries an object 1. The holding device is not shown in FIG. 2. Carrier element 10 is connected to the holding device in affixation regions 3a, 3b. Affixation regions 3a, 3b lie in region A of the free side pieces of carrier element 10. In the illustration in FIG. 2, affixation regions 3a, 3b extend nearly across the entire length of region A of side pieces 10.1, 10.2 of carrier element 10. However, this is not mandatory, but depends on the individual application situation. One skilled in the art will select the length of affixation regions 3a, 3b in such a way that a secure mechanical connection is ensured between carrier element 10 and the holding device. Object 1 carried by carrier element 10 is joined to the carrier element at bridge 10.3 of carrier element 10, which connects side pieces 10.1, 10.2. The connection between object 1 and carrier element 10 is denoted by reference numeral 4. This connection may advantageously be implemented by bonding, soldering or welding. In one application case, object 1 is a measuring reference element, such as a magnet for a deflection measurement in weight sensor systems. As can be gathered from FIG. 2 and from the side view shown in FIG. 3, object 1 essentially has the shape of a cube. FIG. 3 shows a side view of carrier element 10. In this side view, heights A3, B3, C3 of side pieces 10.1, 10.2 of carrier element 10 have been drawn in. In region A, side pieces 10.1, 10.2 have height A3; in region 3 the height is C3, A3 and C3 essentially having the same value. Side pieces 10.1, 10.2 taper noticeably in region B. Starting from a value A3 for the height in region A, the height of side pieces 10.1, 10.2 in general decreases evenly in region B, reaching a minimum having value B3 roughly in the last third of region B. In the direction of region C, the height of side pieces 10.1, 10.2 then increases again up to value C3. It follows from this that the respective height A3, C3 of side pieces 10.1, 10.2 in regions A and C markedly exceeds their individual widths A2, C2. Approximately in the last third of region B, height B3 of side pieces 10.1, 10.2 essentially corresponds to their height B2.

Hereinafter, the method of functioning of carrier element 10 will be elucidated. Carrier element 10 configured according to the present invention provides a secure and shock-proof support of shock-sensitive object 1 and shock-sensitive connection 4.

Because of the considerably reduced height in region B, a lower spring stiffness of side pieces 10.1, 10.2 of carrier element 10 results in this region. This allows shock loads in the x-direction to be absorbed more easily. Due to the tapering sections of side pieces 10.1, 10.2 having a minimal value of B3 in approximately the last third of region B, shock loads in the z-direction are more readily absorbed as well, without permanent deformation of bracket 10. Owing to the tapering sections of side pieces 10.1, 10.2 in region B of carrier element 10, in particular in central region 20, a lower expansion maximum is achieved in shock loads in the z-direction. For practical purposes, the tapering degree is defined such that the expansion is distributed as evenly as possible at edges 21 of region 20. Since side pieces 10.1, 10.2 have a curved design in region B of carrier element 10, shock loads in the direction of the y-axis are likewise absorbed in a satisfactory manner. Since this design allows side pieces 10.1, 10.2 to respond to shock loads in a spring-like manner, excessive loading of connection region 4 is prevented. In a shock load in the direction of arrow 50 (FIG. 2), side pieces 10.1, 10.2 in clamped regions 3a, 3b are strongly accelerated in the direction of arrow 50, i.e., in the positive y-direction. As a result, carrier element in the region of bridge 10.3 attempts to arc in the positive y-direction, i.e., in the direction of arrow 50. This would put a heavy load on connection region 4 and entail the risk of object 1 being separated from carrier element 10. However, at the same time, side pieces 10.1, 10.2 curve outwardly in their bent section, i.e., in region B, in particular in region 30, that is to say, in the direction of arrows 51. This in turn causes a deformation of bridge 10.3 in the direction of arrow 52. By optimizing the position of the bending maxima of side pieces 10.1, 10.2 in regions 30 of region B of carrier element 10, the afore-described, oppositely-directed bending propensities of bridge 10.3 may be compensated in such a manner that, ideally, bridge 10.3 does not deform at all in connection region 4, or deforms only slightly. Of course, the described compensation also takes place if shock loads occur in the reverse direction, i.e., in the direction of arrow 52. The slight or only negligible deformation of bridge 10.3 in connection region 4 allows connection techniques to be used in the joining of object 1 to carrier element 10 that are otherwise particularly sensitive to bending loads. Thin-layer and/or brittle bonding-, soldering- or welding connections can be mentioned here merely by way of example. The described measures may also be utilized separately, on their own. However, the greatest advantage is achieved by implementing the described measures in their entirety.

The means for attaining the object of the present invention allows a shock-proof affixation of a shock-sensitive object on a carrier element. The object may thus be used even for applications in which rough environmental conditions are to be expected, in particular shock loads. The means according to the present invention is especially suited for the affixation of sensors or measuring reference elements (such as magnets) on a carrier element.

Since the connection region between the object and the carrier element is exposed to only relatively low mechanical loading, inexpensive connection techniques may be used.

LIST OF REFERENCE NUMERALS

1 object
3a affixation region
3b affixation region
4 connection
10 carrier element
10.1 side piece
10.2 side piece
10.3 bridge
20 region
21 edge
30 region
50 arrow
51 arrow
52 arrow
A region
B) region
C) region
A1 clearance
B1 clearance
C1 clearance
A2 width
B2 width
C2 width
A3 height
B3 height
C3 height

What is claimed is:

1. A carrier element for an object, comprising:
    two side pieces; and
    a bridge interconnecting the two side pieces such that the carrier element is substantially u-shaped, wherein the bridge is configured to carry the object, the object being one of a sensor and a measuring reference element;
    wherein the side pieces extend substantially in parallel to one another in a first region, extend in a tapered and curved manner in a second region, and in turn extend substantially in parallel to one another again in a third region ending in the bridge,
    wherein the side pieces have a first height in the first region, and a third height in the third region, the heights being substantially identical, and
    wherein a second height of the side pieces in the second region is less than the first and third heights.

2. The carrier element according to claim 1, wherein the side pieces have a first clearance in the first region, and a third clearance in the third region, the first clearance being greater than the third clearance.

3. The carrier element according to claim 1, wherein the side pieces in the regions and the bridge have substantially the same thickness.

4. The carrier element according to claim 1, wherein the heights are greater than thicknesses of the side pieces.

5. The carrier element according to claim 1, wherein the side pieces are formed in such a way that the bridge connecting the side pieces will not substantially deform in response to shock loads.

6. The carrier element according to claim 5, wherein the carrier element is a sensor in a motor vehicle.

7. The carrier element according to claim 5, wherein the carrier element is a measuring reference element carrier for a weight sensor system in a vehicle seat.

8. The carrier element according to claim 5, wherein a portion of the second height of the side pieces in the second region substantially corresponds to a thickness of the second region.

9. The carrier element according to claim 1, wherein the carrier element is used as one of a sensor and a measuring reference element carrier in a motor vehicle.

10. The carrier element according to claim 1, wherein the carrier, element is used as one of a sensor and a measuring reference element carrier for a weight sensor system in a vehicle seat.

11. The carrier element according to claim 1, wherein a portion of the second height of the side pieces in the second region substantially corresponds to a thickness of the second region.

12. The carrier element according to claim 1, wherein the side pieces have a first clearance in the first region, and a third clearance in the third region, the first clearance being greater than the third clearance, and wherein the side pieces are formed in such a way that the bridge connecting the side pieces will not substantially deform in response to shock loads.

13. The carrier element according to claim 1, wherein the side pieces in the regions and the bridge have substantially the same thickness, and wherein the side pieces are formed in such a way that the bridge connecting the side pieces will not substantially deform in response to shock loads.

14. The carrier element according to claim 1, wherein the heights are greater than thicknesses of the side pieces, and wherein the side pieces are formed in such a way that the bridge connecting the side pieces will not substantially deform in response to shock loads.

15. The carrier element according to claim 1, wherein the side pieces have a first clearance in the first region, and a third clearance in the third region, the first clearance being greater than the third clearance, wherein the side pieces in the regions and the bridge have substantially the same thickness, wherein the heights are greater than thicknesses of the side pieces, and wherein the side pieces are formed so that the bridge connecting the side pieces will not substantially deform in response to shock loads.

16. The carrier element according to claim 15, wherein the carrier element is used as one of a sensor and a measuring reference element carrier in a motor vehicle.

17. The carrier element according to claim 15, wherein the carrier element is used as one of a sensor and a measuring reference element carrier for a weight sensor system in a vehicle seat.

18. The carrier element according to claim 15, wherein a portion of the second height of the side pieces in the second region substantially corresponds to a thickness of the second region.

19. The carrier element according to claim 15, wherein the carrier element is a sensor in a motor vehicle.

20. The carrier element according to claim 15, wherein the carrier element is a measuring reference element carrier for a weight sensor system in a vehicle seat.

* * * * *